United States Patent
Dohi

(10) Patent No.: US 7,461,733 B2
(45) Date of Patent: Dec. 9, 2008

(54) VEHICLE BODY TRANSFER APPARATUS

(75) Inventor: Keiji Dohi, Mie (JP)

(73) Assignee: Honda Motor Co., Ltd., Tokyo (JP)

( * ) Notice: Subject to any disclaimer, the term of this patent is extended or adjusted under 35 U.S.C. 154(b) by 140 days.

(21) Appl. No.: 10/567,777

(22) PCT Filed: Aug. 6, 2004

(86) PCT No.: PCT/JP2004/011347
§ 371 (c)(1),
(2), (4) Date: Feb. 9, 2006

(87) PCT Pub. No.: WO2005/014376
PCT Pub. Date: Feb. 17, 2005

(65) Prior Publication Data
US 2006/0219525 A1     Oct. 5, 2006

(30) Foreign Application Priority Data
Aug. 11, 2003    (JP) .............................. 2003-291048

(51) Int. Cl.
*B65G 37/00* (2006.01)
(52) U.S. Cl. ............... 198/346.3; 198/345.1; 198/678.1
(58) Field of Classification Search ............. 198/678.1, 198/247, 681, 465.4, 345.1, 346.1, 346.2, 198/346.3
See application file for complete search history.

(56) References Cited

U.S. PATENT DOCUMENTS

| | | | | |
|---|---|---|---|---|
| 2,970,549 A | * | 2/1961 | Volk et al. .................... 104/50 |
| 3,958,664 A | * | 5/1976 | Perkins ........................ 187/209 |
| 4,294,016 A | * | 10/1981 | Wilkerson .................... 33/600 |
| 5,335,755 A | * | 8/1994 | Miller ........................ 414/249 |

(Continued)

FOREIGN PATENT DOCUMENTS

JP        54-067935        5/1979

(Continued)

OTHER PUBLICATIONS

Chinese Office Action dated Aug. 3, 2007 and English translation.

(Continued)

*Primary Examiner*—James R Bidwell
(74) *Attorney, Agent, or Firm*—Kratz, Quintos & Hanson, LLP

(57) ABSTRACT

A vehicle transfer apparatus (1), which transfers a vehicle body (M) in an up-and-down direction, is composed of a pair of stanchions (2), a lift-unit (3), a tire supporter (6) (7), a lift-unit driver (4), and a tire supporter driver (53). In this apparatus (1), a lift-unit (3) is provided to respective stanchions (2), which are disposed on both sides of the vehicle body (M), and is allowed to slide in an up-and-down direction along the stanchion (2) in compliance with the operation by the lift-unit driver (4). In this apparatus (1), the tire supporter (6), which supports the tire (T) in the condition that the lower part of the tire (T) is exposed under the tire supporter (6) is provided to each lift-unit (3), is adapted to control a linear motion between a tire support position and a passing position by the tire supporter driver (4).

4 Claims, 8 Drawing Sheets

U.S. PATENT DOCUMENTS

| | | | | |
|---|---|---|---|---|
| 5,340,249 | A * | 8/1994 | Nakamura | 410/78 |
| 6,634,461 | B1 * | 10/2003 | Baker | 187/247 |
| 6,695,126 | B2 * | 2/2004 | Minamikawa | 198/680 |
| 6,695,129 | B1 * | 2/2004 | Eschenweck | 198/803.14 |
| 7,014,012 | B2 * | 3/2006 | Baker | 187/247 |
| 7,073,778 | B2 * | 7/2006 | Gibson et al. | 254/323 |
| 7,219,770 | B2 * | 5/2007 | Baker | 187/247 |

FOREIGN PATENT DOCUMENTS

| | | |
|---|---|---|
| JP | 62-50123 | 3/1987 |
| JP | 62-216878 | 9/1987 |
| JP | 01-115786 | 5/1989 |
| JP | 2-117508 | 5/1990 |
| JP | 2-117516 | 5/1990 |
| JP | 3-186510 | 8/1991 |
| JP | 2573699 | 10/1996 |
| JP | 2662264 | 6/1997 |
| JP | 11-268823 | 10/1999 |

OTHER PUBLICATIONS

Japanese Office Action dated Apr. 15, 2008 with a partial English translation.

* cited by examiner

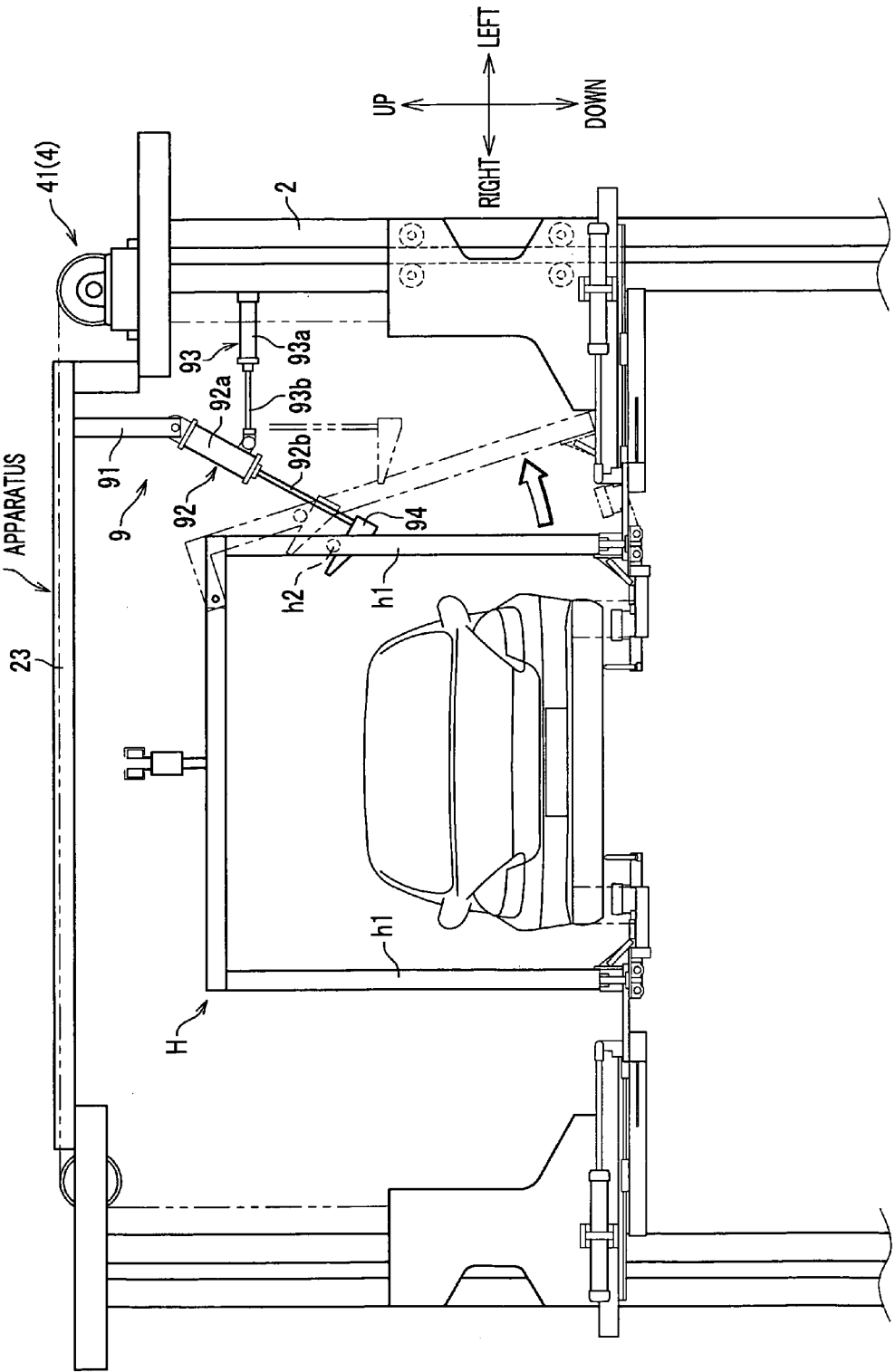

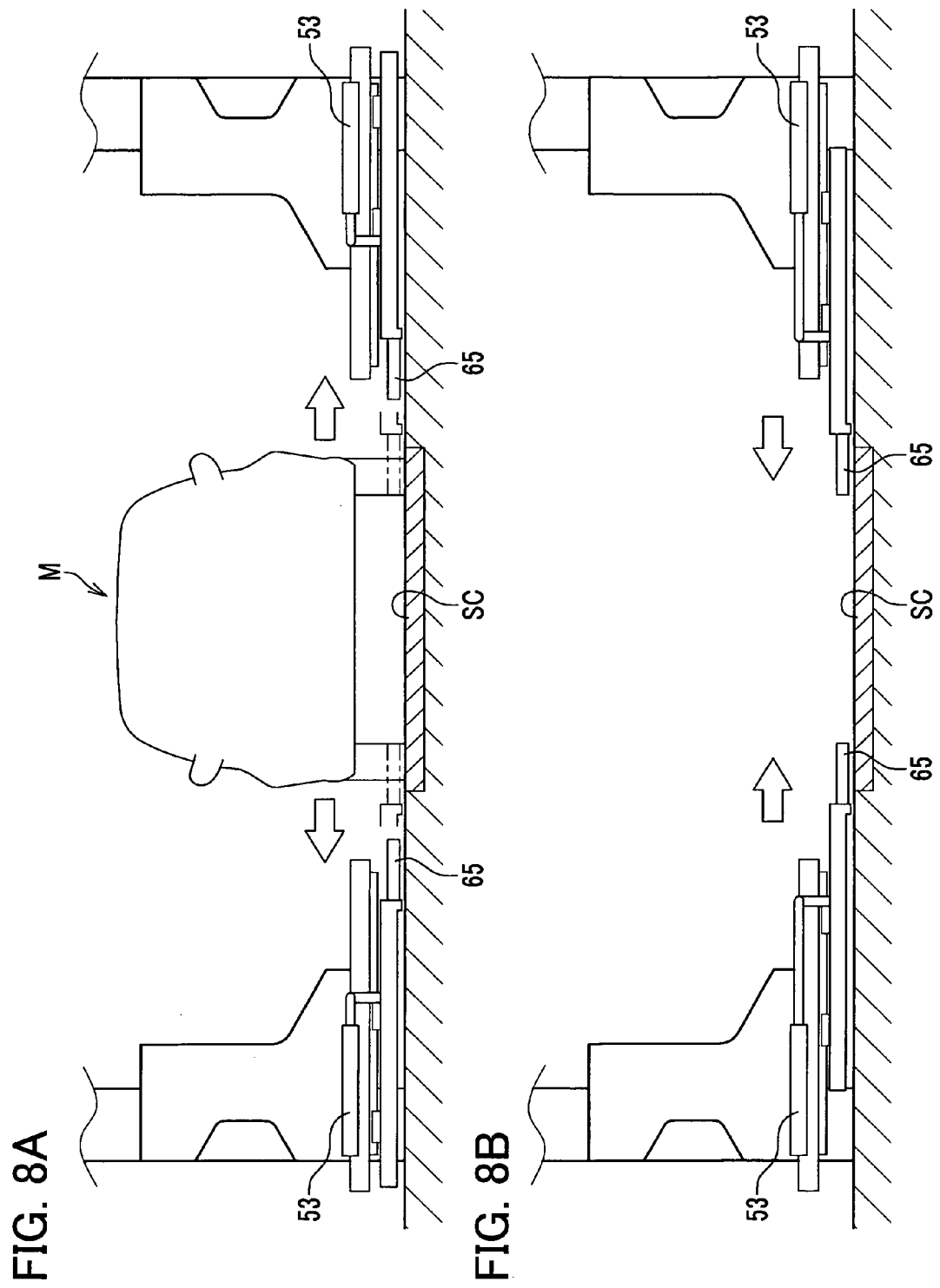

VEHICLE BODY TRANSFER APPARATUS

BACKGROUND OF THE INVENTION

1. Field of the Invention

The present invention relates to a vehicle transfer apparatus, which performs a transfer of a vehicle body between an upper-side conveyance line and a lower-side conveyance line that are installed in a vehicle assembly line.

2. Description of Relevant Art

Conventionally, a vehicle assembly line includes a hanger-type conveyance line and a support-type conveyance line.

The hanger-type conveyance line suspends a vehicle body using a conveyance hanger in order to install various parts, such as an engine, a transmission, an exhaust nozzle, and tires etc., which are normally installed from a bottom-side of the vehicle body. The support-type conveyance line holds the vehicle body using a slat conveyor from a bottom-side of the vehicle body in order to install exterior parts etc., which are normally installed from an upper-side of the vehicle body.

In this kind of the assembly line, a vehicle body transfer apparatus, which transfers a vehicle body from the hanger-type conveyance line to the support-type conveyance line, is provided.

As an example of this kind of the vehicle body transfer apparatus, the vehicle body transfer apparatus disclosed in Japanese unexamined Patent Publication No. H11-268823 has been discovered.

The apparatus disclosed in this Japanese unexamined Patent Publication is composed of guide-stanchions positioned on both sides of a vehicle body to be transferred, a lift-unit which moves in an up-and-down direction along the guide-stanchion, and a support-base which moves in a horizontal direction from the lift-unit and changes the total length thereof in order to support the vehicle body.

In this vehicle body transfer apparatus, a vehicle body is once passed to a support tool disposed on the support-base from the conveyance hanger at the upper-side of the vehicle body transfer apparatus. Then, the vehicle body is moved downwardly together with the lift-unit and is passed to a slat conveyor positioned in a lower-side of the vehicle body transfer apparatus.

In this apparatus, normally, the vehicle body is transferred while supporting a flange of a side-sill of the vehicle body using the support tool, when performing the transfer of the vehicle body. This is because each jack-up point of the vehicle body is already being supported by the conveyance hanger in order to convey the vehicle body.

In this conventional vehicle body transfer apparatus, since the flange of the side-sill of the vehicle body is held by the support tool, the impact, which is caused when the vehicle body is passed to the support tool from the conveyance hanger or when the lift-unit is stopped at the predetermined position, may cause the deformation on the flange of the side-sill.

Therefore, the vehicle body transfer apparatus, by which a vehicle body is surely transferred between the upper-side conveyance line and the lower-side conveyance line without causing the deformation on the vehicle body, has been required.

SUMMARY OF THE INVENTION

The present invention relates to a vehicle transfer apparatus, which transfers a vehicle body between a conveyance line disposed in a lower-side of a vehicle conveyance line and a conveyance line disposed in an upper-side of the vehicle conveyance line.

The vehicle transfer apparatus is composed of a pair of stanchions, a lift-unit, a tire supporter, a lift-unit driver, and a tire supporter driver. In this apparatus, a lift-unit is provided to respective stanchions, which are disposed on both sides of the vehicle body, and is allowed to slide in an up-and-down direction along the stanchion in compliance with the operation by the lift-unit driver.

In this apparatus, additionally, the tire supporter, which supports the tire in the condition that the lower part of the tire is exposed under the tire supporter, is provided to each lift-unit, and this tire supporter is adapted to move between a tire support position and a passing position by a linear motion under the control of tire supporter driver.

According to this vehicle transfer apparatus, when vehicle body is transferred to the conveyance line disposed in a lower-side from the conveyance line disposed in a upper-side of the vehicle conveyance line, the vehicle body, whose jack-up points are being held by conveyance hangers, respectively, is raised by the tire supporter of the lift-unit in the condition that each tire of the vehicle body is held by the tire supporter.

Next, after disengaging each conveyance hanger from the vehicle body, the lift-unit, which is placing the vehicle body thereon, is moved downwardly till the tire of the vehicle body comes in contact with the conveyance line disposed in a lower-side. Then, after moving the tire supporter to the passing position in compliance with the actuation of the tire supporter driver, the vehicle body is conveyed by the conveyance line disposed in a lower-side.

That is, in the present invention, the vehicle body is transferred while holding the tires of the vehicle body, when vehicle body is transferred to the conveyance line disposed in the lower-side from the conveyance line disposed in the upper-side of the vehicle conveyance line using the vehicle transfer apparatus. Therefore, since the impact to be caused during the transfer of the vehicle is mitigated by tire, the occurrence of the deformation of the vehicle body due to the impact can be prevented.

In the present invention, additionally, when the vehicle body is passed to the conveyance line disposed in the lower side from the vehicle transfer apparatus, since each tire T is supported by the tire supporter in the condition that the lower part of the tire is exposed under the tire supporter, the tire T firstly comes in contact with the surface of the conveyance line disposed in the lower-side. Therefore, since the impact to be caused when the vehicle body is passed to the conveyance line disposed in the lower-side from the vehicle transfer apparatus is mitigated by tire, the occurrence of the deformation of the vehicle body due to the impact can be prevented.

In the present invention, preferably but it is not necessary, the tire supporter includes a pair of chucking arms and an arm driver, which controls the position of the pair of chucking arms between a tire holding position and a tire release position.

According to the vehicle transfer apparatus, when the vehicle body is passed from the vehicle transfer apparatus to the conveyance line disposed in a lower-side, the vehicle body is transferred while holding the tire by chucking arms placed at the tire holding position. Then, chucking arms are removed from the tire by changing the position of chucking arms to the tire release position after the tire comes in contact with the surface of the conveyance line disposed in the lower-side and the load due to the vehicle body is not received by chucking arms. Thereby, the vehicle body can be passed to the conveyance line disposed in the lower-side.

That is, the hold and release of each tire of the vehicle body is controlled by changing the position of chucking arms between the tire holding position and the tire release position, when the vehicle body is passed from the vehicle transfer apparatus to the conveyance line disposed in the lower-side. Thus, chucking arms are easily removed from the tire.

In the present invention, additionally, it is preferable that a part of the chucking arm that has contact with the tire is a rotatable roller.

In this case, since the rotatable roller is provided, chucking arms can be removed from the tire even if the load due to the vehicle body is being applied to the chucking arms.

This is because a frictional restriction between the tire and the chucking arm prevents the removing of the chucking arm from the tire, if the chucking arm is un-rotatable, in comparison with the case where the chucking arm is being rotatable.

That is, when the vehicle body is passed to the conveyance line disposed in the lower-side from the vehicle conveyance line, the chucking arm can be removed from the tire due to the rotation of the roller even if the load caused by the vehicle body is applied to the chucking arm.

BRIEF DESCRIPTION OF THE DRAWINGS

FIG. 4 is a front view of the release unit to be used for releasing the hanger arm.

FIG. 8A is a front view showing the state where each chucking arm comes away from a tire.

FIG. 8B is a front view showing the state where each chucking arm comes near to a tire.

DETAILED DESCRIPTION OF THE PREFERRED EMBODIMENT

The preferred embodiment of the present invention will be explained with reference to accompanying drawings.

Figure 1:
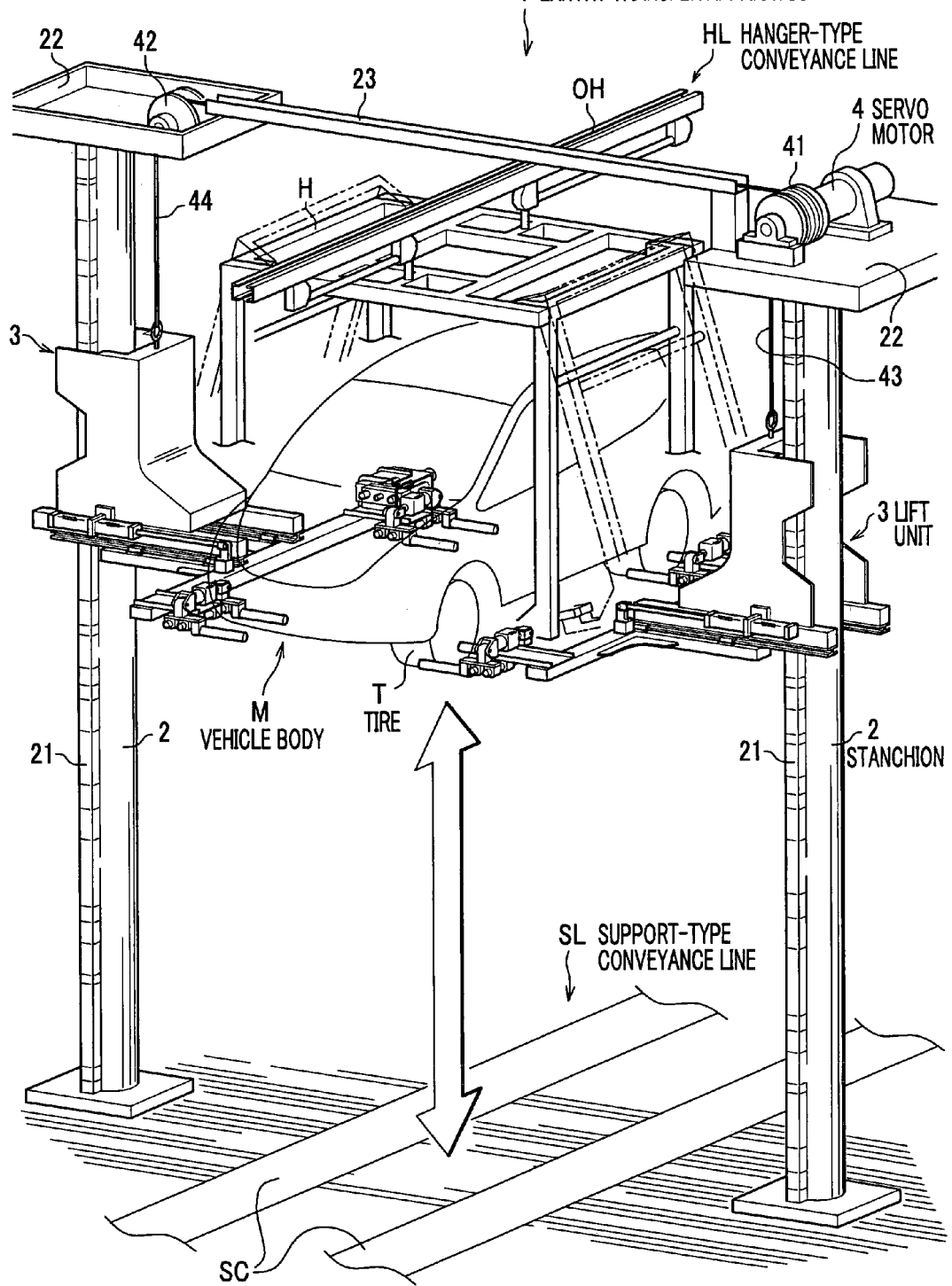
FIG. 1 is a perspective view showing a gantry transfer apparatus according to the present invention's embodiment.

Referring to FIG. 1, a gantry transfer apparatus (vehicle transfer apparatus) 1 transfers a vehicle body M to a support-type conveyance line SL disposed in a lower-side of a vehicle conveyance (assembly) line from a hanger-type conveyance line HL disposed in an upper-side of the vehicle conveyance (assembly) line.

Here, the hanger-type conveyance line HL is a line, in which a vehicle body M is held by a conveyance hanger H suspended from an overhead conveyor OH and is conveyed in the condition that the vehicle body M is suspended from the overhead conveyor OH.

The support-type conveyance line SL is a line, in which a vehicle body M is conveyed while holding the tires T of the vehicle body M on the slat conveyor.

The hanger-type conveyance line HL and the support-type conveyance line SL are arranged coaxially, that is, the hanger-type conveyance line HL and the support-type conveyance line SL are disposed in a line along a conveyance direction when each line is viewing from the top.

In each conveyance line, each vehicle body is conveyed while directing the front-side of the vehicle body M to a conveyance direction.

In the following explanation, the term "up-and-down direction" and "left-and-right direction" mean an up-and-down direction and a left-and-right direction with respect to the vehicle body M, respectively. That is, the term "right-side", "left-side", "fore-side", and "rear-side" are defined based on a transfer direction of the vehicle body M.

The gantry transfer apparatus 1 includes essentially a pair of stanchion 2, lift-units 3, and a servomotor (a lift-unit driving unit) 4. Here, the lift-unit 3 is provided to each stanchion 2 and is moved in an up-and-down direction along the stanchion 2 by the servomotor 4.

The stanchion 2 is a column-like shaped frame, and is disposed on both sides of a vehicle body M so that the vehicle body M conveyed from the hanger-type conveyance line HL is positioned between adjacent stanchions 2.

Rails 21, which guide the movement in an up-and-down direction of the lift-unit 3, are provided on the fore-side and rear-side of the stanchion 2, respectively. Respective rails 21 are provided along an axial direction of the stanchion 2. In FIG. 1, the rail 21 provided in the rear-side of the stanchion 2 is under cover of the stanchion 2, and is therefore not shown in this figure.

A rack 22 for placing the servomotor 4 etc., is provided at the top of respective stanchions 2. A connection beam 23, which is an approximately U-like shaped beam in sectional viewing, is laid across racks 22 in the condition that a groove of the connection beam 23 is directed upwardly.

The rack 22 of the stanchion 2 positioned in a left-side with respect to the vehicle body M (shown in a right-side in FIG. 1) is provided with the servomotor 4 and a driving gear 41, which is connected to a rotation shaft of the servomotor 4.

The rack 22 of the stanchion 2 positioned in a right-side with respect to the vehicle body M is provided with a driven gear 42, which rotates in response to the drive of the driving gear 41.

In the present embodiment, the stanchion 2 positioned in a left-side with respect to the vehicle body M and the stanchion 2 positioned in a right-side with respect to the vehicle body M are indicated as "left-side stanchion" and "right-side stanchion", respectively, as appropriate.

One end of chains 43 and 44 is respectively fixed to the driving gear 41. The other end of the chain 43 is fixed to the lift-unit 3 of the left-side stanchion 2, and the other end of the chain 44 is fixed to the lift-unit 3 of the right-side stanchion 2.

As can be seen from FIG. 1, the chain 44 lubricated with oil is passed through the groove of the connection beam 23, which is an approximately U-like shaped beam in sectional viewing. Thus, the oil of the chain 44 is not dripped down and does not adhere (contaminate) to the vehicle body M to be conveyed along the overhead conveyor OH.

Figure 2:
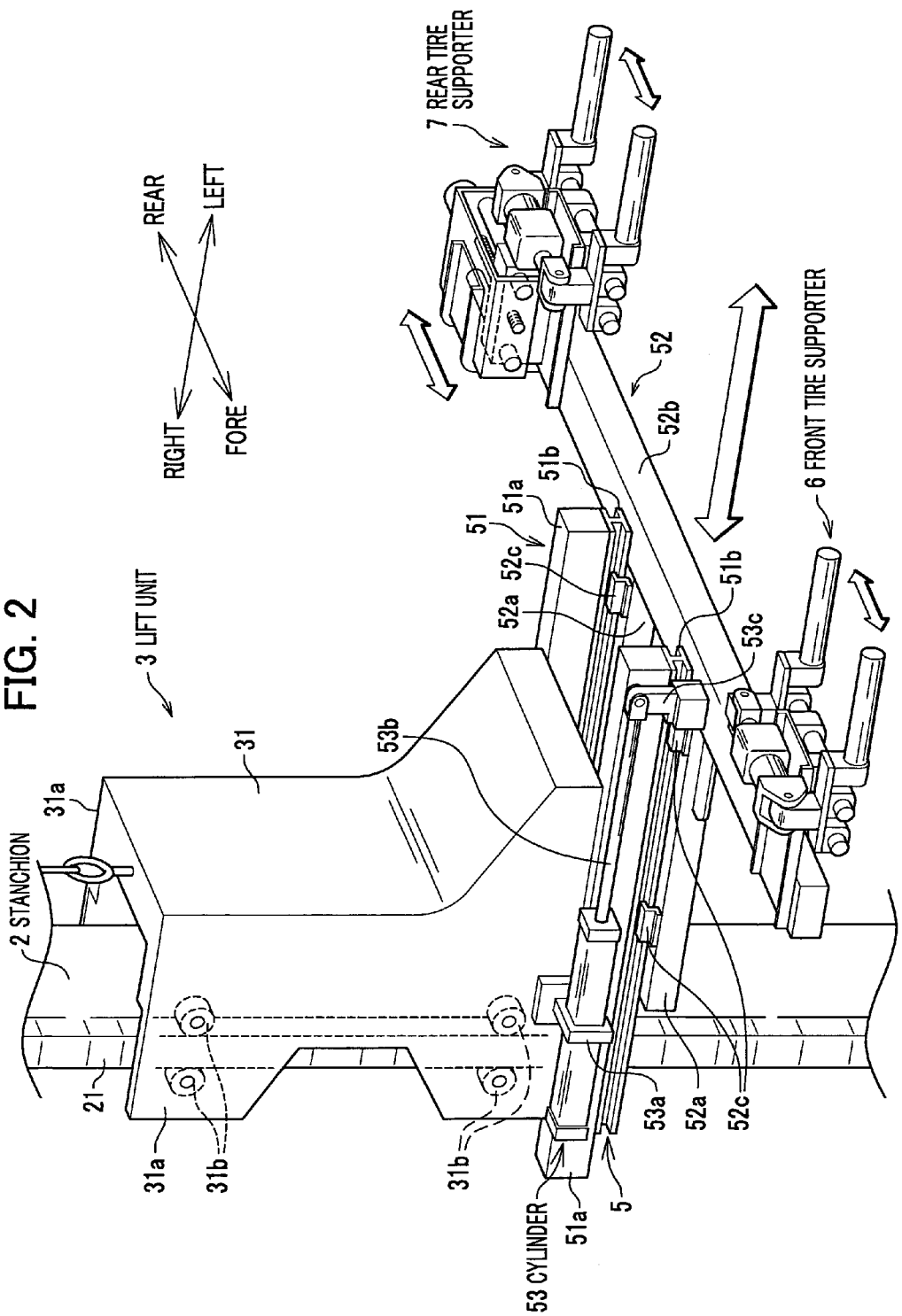
FIG. 2 is an enlarged perspective view showing the lift-unit of FIG. 1 in detail

As shown in FIG. 2, the lift-unit 3 is mainly composed of a lifter body 31, a slider unit 5, a front tire supporter 6, and a rear tire supporter 7.

Here, the front tire supporter 6 and the rear tire supporter 7 serve as a tire supporter.

The lifter body 31 is formed of a hollow casing having base-parts 31*a* and 31*a*, which are arranged so as to cover the fore-and-rear sides of the stanchion 2. Guide rollers 31*b*, each pair of which sandwiches the rail 21 and allows the lifter body 31 to move in an up-and-down direction, is disposed inside of respective base-parts 31*a*.

The slider unit 5 is mainly composed of a guide 51, a slider 52, and a cylinder 53. The slider 52 is held by the guide 51 and is allowed to slide along the guide 51 under the control of the cylinder 53. That is, in the present embodiment, the slider 52 is held by the guide 51 in the condition that the slider 52 is allowed to slide in a left-and-right direction under the control of the cylinder 53.

The guide 51 is mainly composed of a pair of guide frames 51a and guide rails 51b. The guide frame 51a is provided with a guide rail 51b, which has an alphabet "H" shape in sectional viewing. In this embodiment, a total of two guide frames 51a are fixed to the bottom of the lifter body 31 along a left-and-right direction, and the position where the guide frame 51a is fixed are the fore-side end and the rear-side end of the lifter body 31.

The slider 52 is mainly composed of a pair of support arm 52a and a support plate 52b, which is fixed to the end of respective support arms 52a.

A pair of hook-shaped fittings 52c, which are adapted to engage with fore-side and rear-side ends of the guide rail 51b, is provided on each support arm 52a. In this embodiment, both right-side and left-side of each support arm 52a are provided with a pair of hook-shaped fittings 52c with a predetermined distance therebetween. Here, one of hook-shaped fittings 52c positioned in the rear-side of the support arm 52a is under cover of the support arm 52a in FIG. 2.

The slider 52 is suspended from guide rails 51b using fittings 52c and is allowed to slide in a left-and-right direction in the state where the slider 52 is hung down from the guide rail 51b.

The cylinder 53 is disposed only on a fore-side of the lifter body 31, and is fixed using a supporting bracket 53a, which is provided across the base-part 31a of the lifter body 31 and the guide frame 51a.

A cylinder rod 53b of the cylinder 53 connects with a bracket 53c at the end thereof, and the cylinder 53 is fixed in place to the support plate 52b through the bracket 53c.

The front tire supporter 6 for holding the front tire T of the vehicle body M is provided at the fore-side end of the support plate 52b. The front tire supporter 6 is adapted to move in a left-and-right direction together with the slide of the slider 52. That is, in this embodiment, the front tire supporter 6 is allowed to move between the tire support position and the passing position.

Figure 3A:
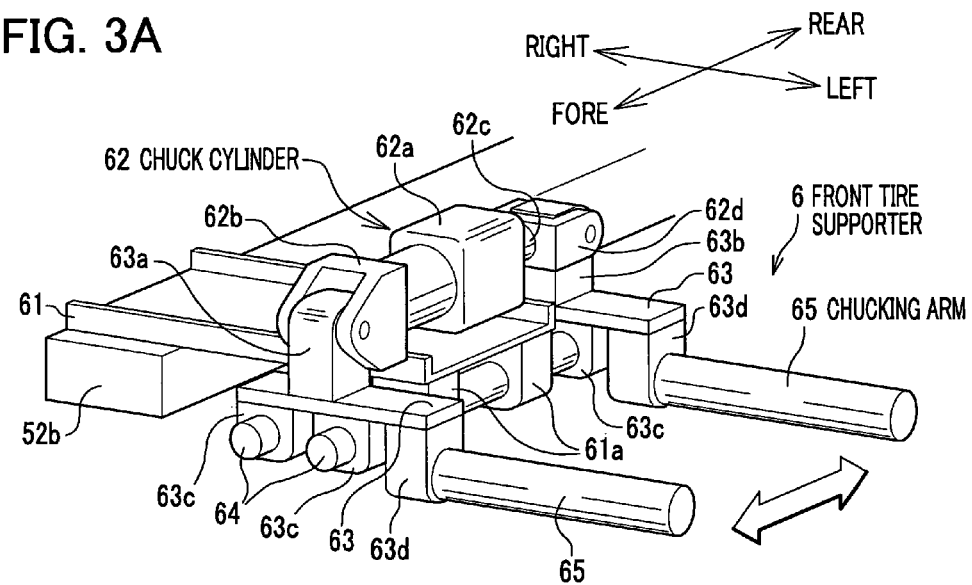
FIG. 3A is an enlarged perspective view showing the front tire supporter of FIG. 2 in detail.

To be more specific, the front tire supporter 6, as shown in FIG. 3A, includes a cylinder support plate 61, a chuck cylinder 62, a pair of arm support plates 63 and 63, a pair of guide rods 64 and 64, and a pair of chucking arms 65 and 65.

Here, the term "tire support position" means that the front tire supporter 6 is positioning at the position where the front tire T of the vehicle M transferred within the gantry transfer apparatus 1 can be supported, from the bottom of the tire T, by the front tire supporter 6. That is, the term "tire support position" means that the position where the front tire supporter 6 is located at a vehicle body side in a left-and-right direction.

Additionally, the term "passing position" means that the front tire supporter 6 is positioning at the position where the front tire T of the vehicle body M cannot be supported by the front tire supporter 6. That is, the term "passing position" means that a position where the front tire supporter 6 is located at an opposite side in a left-and-right direction with respect to the vehicle body M so that the front tire supporter 6 departs from the vehicle body M.

The cylinder support plate 61, which is an approximately U-like shaped plate in sectional viewing, is obtained by bending upwardly both fore-and-rear ends of a flat-shaped plate in order to strengthen the stiffness of the cylinder support plate 61.

The cylinder support plate 61 is fixed to the fore-side end of the support plate 52b at a base region thereof.

The opposing end with respect to the base region of the cylinder support plate 61 is provided with the chuck cylinder 62 and rod supporters 61a. Here, the chuck cylinder 62 is fixed to the top of the cylinder support plate 61 using a bracket (not shown), and the rod supporter 61a, which is used for receiving column-shaped guide-rods therein, is fixed to the bottom of the cylinder support plate 61.

The chuck cylinder 62 moves mutually chucking arms 65 and 65 along a fore-and-rear direction, and changes the position of the chucking arms 65 between the tire holding position and the tire release position.

A body-side bracket 62b is provided at a fore-side end of the cylinder body 62a and a rod-side bracket 62d is provided at a rear-side end of a cylinder rod 62c.

Here, the term "tire holding position" means the position where the distance between chucking arms 65 is smaller than the diameter of the tire T, and the term "tire release position" means the position where the distance between chucking arms 65 is larger than the diameter in a fore-and-rear direction of the tire T.

The arm support plate 63 placed in a fore-side is pivotably supported by the body-side bracket 62b using a bracket 63a, and the arm support plate 63 placed in a rear-side is also pivotably supported by the rod-side bracket 62d using a bracket 63b.

Each arm support plate 63 is provided with guides 63c, each of which slidably supports the guide-rod 64 therein so as to allow the slide along the guide-rod 64. Also, each arm support plate 63 is provided with a support part 63d, which rotatably supports the chucking arm 65 therein. That is, the chucking arm 65 serves as a roller, which is rotatably connected to the support part 63d.

In this embodiment, respective chucking arms 65 are a column-like shaped member, and are arranged so that a predetermined interval is provided therebetween. Thereby, since a pair of chucking arms 65 provides a two-points support for a tire T, the tire T is supported by a pair of chucking arms 65 from a bottom-side thereof in the condition that a part of the lower part of the tire T is positioned under the chucking arms 65.

The chucking arm 65 positioned in a rear-side is allowed to move in a fore-and-rear direction. To be more precise, when the chucking arm 65 positioned in a rear-side is pushed to the rear-side by the chuck cylinder 62, the position of chucking arms 65 is changed from the tire holding position to the tire release position. On the contrary, when the chucking arm 65 positioned in a rear-side is pulled to the fore-direction by the chuck cylinder 62, the position of chucking arms 65 is changed from the tire release position to the tire holding position.

Figure 3B:
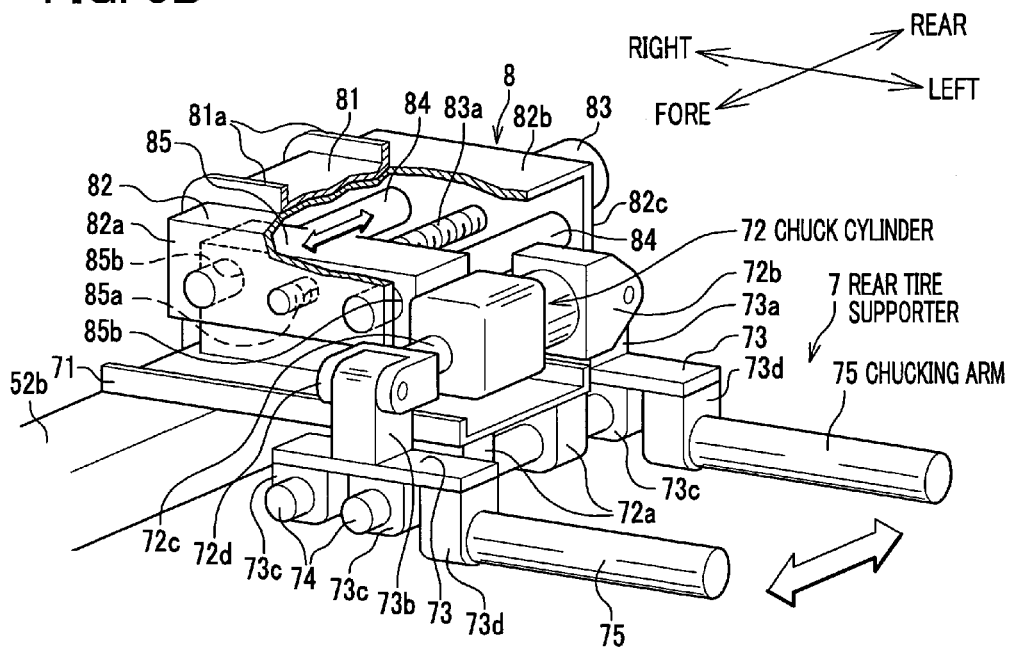
FIG. 3B is an enlarged perspective view showing the rear tire supporter of FIG. 2 in detail.

As shown in FIG. 3B, the rear tire supporter 7 has the same construction as the front tire supporter 6, and is mainly composed of a cylinder support plate 71, a chuck cylinder 72, a pair of arm support plates 73, a pair of guide-rods 74, and a pair of chucking arms 75, each has the same construction as corresponding component of the front tire supporter 6.

The rear tire supporter 7 further includes rod supporters 72a, a body-side bracket 72b, a rod-side bracket 72d, a bracket 73a, a bracket 73b, guides 73c, support parts 73d, each has the same construction as corresponding component of the front tire supporter 6.

In the rear tire supporter 7, differing from the front tire supporter 6, the chuck cylinder 72 is installed so that a cylinder rod 72c is positioned in a fore-side. Thereby, the chucking arm 75 placed in a fore-side is allowed to move along a fore-and-rear direction.

The cylinder support plate 71 of the rear tire supporter 7 is adapted to move in a fore-and-rear direction by a supporter slide mechanism 8, which is disposed at the rear-side end of the support plate 52b.

The supporter slide mechanism 8 is mainly composed of an L-shaped bracket 81, a slider base 82, a servo motor 83, a pair of guide rods 84, and a slider body 85.

The L-shaped bracket 81 is an L-like shaped plate formed by bending a flat shaped plate into an L-like shape in sectional viewing. Both fore-and-rear ends of the L-shaped bracket 81 are bent upwardly so as to strengthen the stiffness of the L-shaped bracket 81.

In the present embodiment, as shown in FIG. 3B, the L-shaped bracket 81 is fixed to the rear-side of the support plate 52b, such that one end of the L-shaped bracket 81 is directed to an inside (vehicle body) direction and the other end of the L-shaped bracket 81 is directed to a downward direction. In this occasion, the L-shaped bracket 81 is fixed so that a predetermined space is provided between the surface of the bend-part on one end of the L-shaped bracket 81 and the top surface of the support plate 52b.

The slider base 82, which is an approximately U-like shaped plate in sectional viewing, and is obtained by bending into the same direction both fore-and-rear ends of a flat-shaped plate. Here, the bend-end disposed in a fore-side serves as a fore-side wall 82a and the bend-end disposed in a rear-side serves as a rear-side wall 82c, and the remainder of the plate serves as a bottom wall 82b. As can be seen from FIG. 3B, the bottom of the bend end of the L-shaped bracket 81 is fixed to the slider base 82 so that the space enclosed by the fore-side wall 82a and the rear-side wall 82c is directed to a downward direction.

A body-part of the servo motor 83 is fixed to the rear-side wall 82c of the slider base 82 at approximate center of the rear-side wall 82c. A threaded rod 83a, which is obtained by forming a thread on a rotation shaft of the servo motor 83, is rotatably supported by the fore-side wall 82a and the rear-side wall 82c.

A pair of guide rods 84, each of which connects fore-side wall and rear-side wall, are disposed on left-and-right sides of the threaded rod 83a.

The slider body 85 is provided with a center through hole 85a and through holes 85b and 85b, each of which penetrates the slider body 85 along a fore-and-rear direction. The center through hole 85a is positioned at middle in a longitudinal direction of the slider body 85 and is provided with an internal thread therein. The through hole 85b is positioned on both sides in a left-and-right direction of the center through hole 85a.

In this embodiment, the threaded rod 83a is screwed into the center through hole 85a, and guide rod 84 is slidably inserted into each through hole 85b.

The bottom of the slider body 85 is fixed to the cylinder support plate 71, which serves as the base of the rear tire supporter 7.

According to these constructions, when the threaded rod 83a is rotated in compliance with the actuation of the servo motor 83, the slider body 85 is moved in a fore-and-rear direction together with rear tire supporter 7.

As shown in FIG. 4, the gantry transfer apparatus 1 is provided with a release unit 9 which releases a vehicle body M from the engagement with the hanger arm h1 of the conveyance hanger H.

The release unit 9 is provided at an upper left position and an upper right position of the gantry transfer apparatus 1. Here, in FIG. 4, the release unit 9 provided at the upper left position is omitted. In the following explanations, since each release unit 9 has the same construction, the explanation is mainly made with respect to the release unit 9 provided at the upper right position of the gantry transfer apparatus 1, and the explanation about the other of the release unit 9 will be omitted.

The release unit 9 is mainly composed of a frame 91, a first cylinder 92, a second cylinder 93, and an engagement part 94.

The frame 91 is fixed to the bottom of the connection beam 23 of the gantry transfer apparatus 1, and is connected to a body part 92a of the first cylinder 92 at the bottom thereof, while allowing a pivotal movement in a left-and-right direction of the body part 92a.

A body part 93a of the second cylinder 93 is fixed to the inner-side of the stanchion 2 of the gantry transfer apparatus 1, the end of a cylinder rod 93b is pivotably connected to the body part 92a of the first cylinder 92.

The engagement part 94 is provided at the end of a cylinder rod 92b of the first cylinder 92, and elongates to an inward direction from the cylinder rod 92b so as to hook the arm connection beam h2, which is positioned at lower-side, of the hanger arm h1 by the engagement part 94.

In the release unit 9 having these constructions, in usual state, overall length of the cylinder rod 92b of the first cylinder 92 is being extended and overall length of the cylinder rod 93b of the second cylinder 93 is being shortened.

When disengaging the hold by hanger arm h1, firstly, the first cylinder 92 is turned to an inward direction (toward a vehicle body M) by extending the overall length of the cylinder rod 93b of the second cylinder 93. Then, the arm connection beam h2 is hooked by the engagement part 94 and is moved to an obliquely upward direction by shortening the overall length of the cylinder rod 92b of the first cylinder 92. Thereby, the disengagement of the hanger arms h1 can be achieved.

Figure 5:
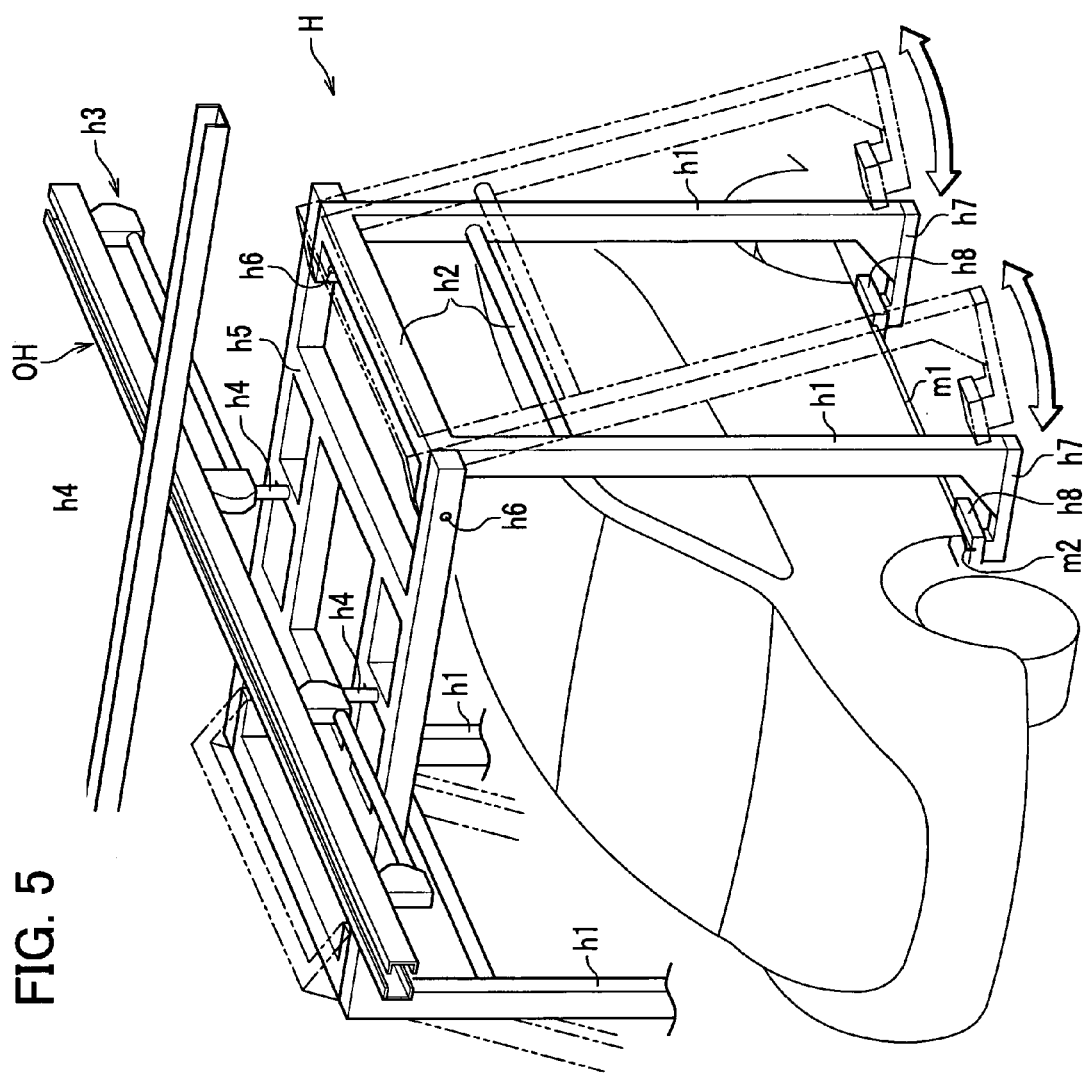
FIG. 5 is an enlarged perspective view showing a conveyance hanger.

As shown in FIG. 5, the conveyance hanger H is mainly composed of connecting rods h4, a hanger base h5, arm struts h6, hanger arms h1, and arm connection beams h2. In this conveyance hanger H, the connecting rod h4 connects a moving body h3, which is movable along an overhead conveyor OH, with the hanger base h5. Each corner (a total of four corners) of the hanger base h5 is provided with the arm strut h6, which elongates to a sideward direction and which pivotably supports the hanger arm h1 at end thereof. Thereby, a pair of hanger arms h1, which are connected each other by arm connection beams h2, are provided to each side of the hanger base h5.

A connection beam h7, which elongates to an inward direction, is provided at the bottom of each hanger arm h1, and a support h8 which supports a jack-up point m2 provided at the side-sill of the vehicle body M, is provided at the end of the connection beam h7. In other words, each hanger arm h is provided with the connection beam h7 which elongates toward the vehicle body M from the bottom thereof, and the inside end (vehicle body side end) of the connection beam h7 is provided with the support h8 for supporting the jack-up point m2 of the vehicle body M.

Next a vehicle transfer method using the gantry transfer apparatus 1 will be explained.

Figure 6A:
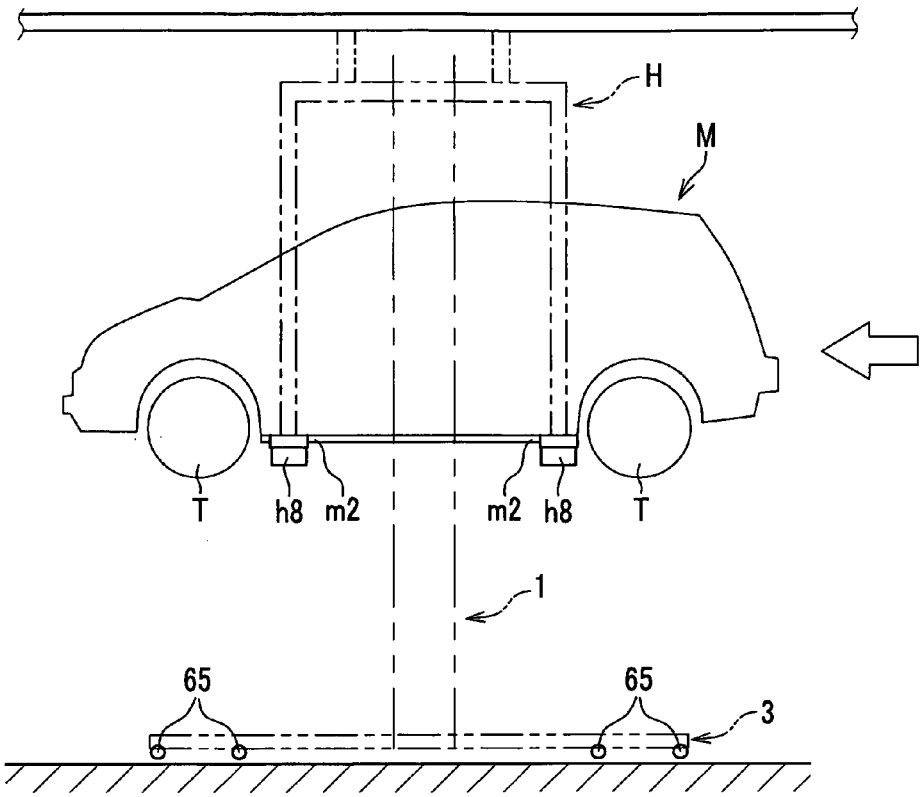
FIG. 6A is a side view showing the state where a vehicle body is conveyed to the gantry transfer apparatus.

As shown in FIG. 6A, the conveyance hanger H holding the vehicle body M therein is conveyed into the gantry transfer apparatus 1.

In this occasion, the lift-unit 3 of the gantry transfer apparatus 1 is on standby at the lower-side position in the condition where each chucking arm 65 is closed. In this occasion, each chucking arm 65 is positioned at the tire holding position.

Figure 6B:
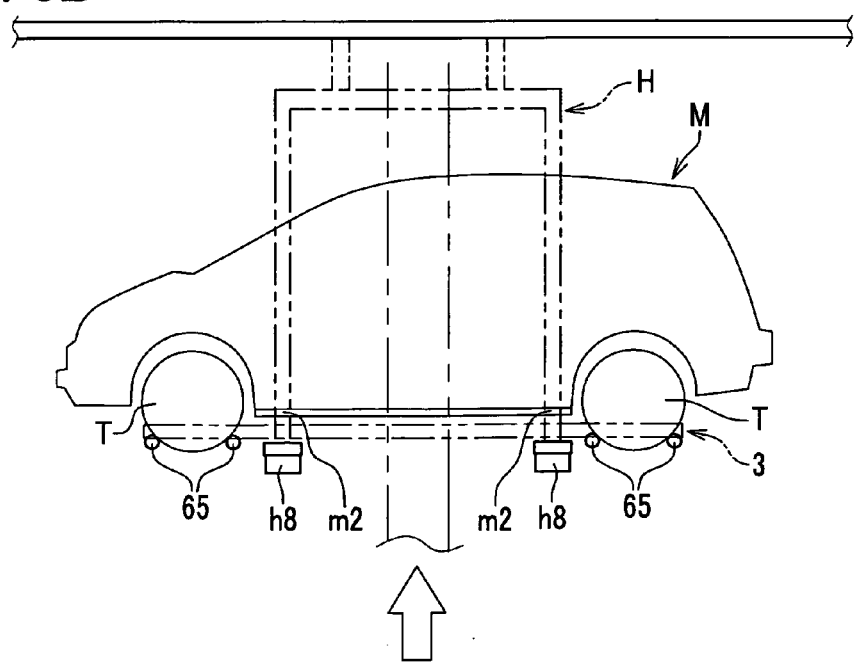
FIG. 6B is a side view showing the state where a vehicle body is raised by a lift-unit.

As shown in FIG. 6B, when the conveyance hanger H is stopped at the predetermined position by a stopper (not shown), the lift-unit 3 moves to an upward direction, and each pair of chucking arms 65 contacts with the corresponding tire T of the vehicle body M. This upward movement of the lift-unit 3 is continued till the vehicle body M, which is supported by the support h8 of the conveyance hanger H at the jack-up point m2, is disengaged from the support h8.

Figure 7:
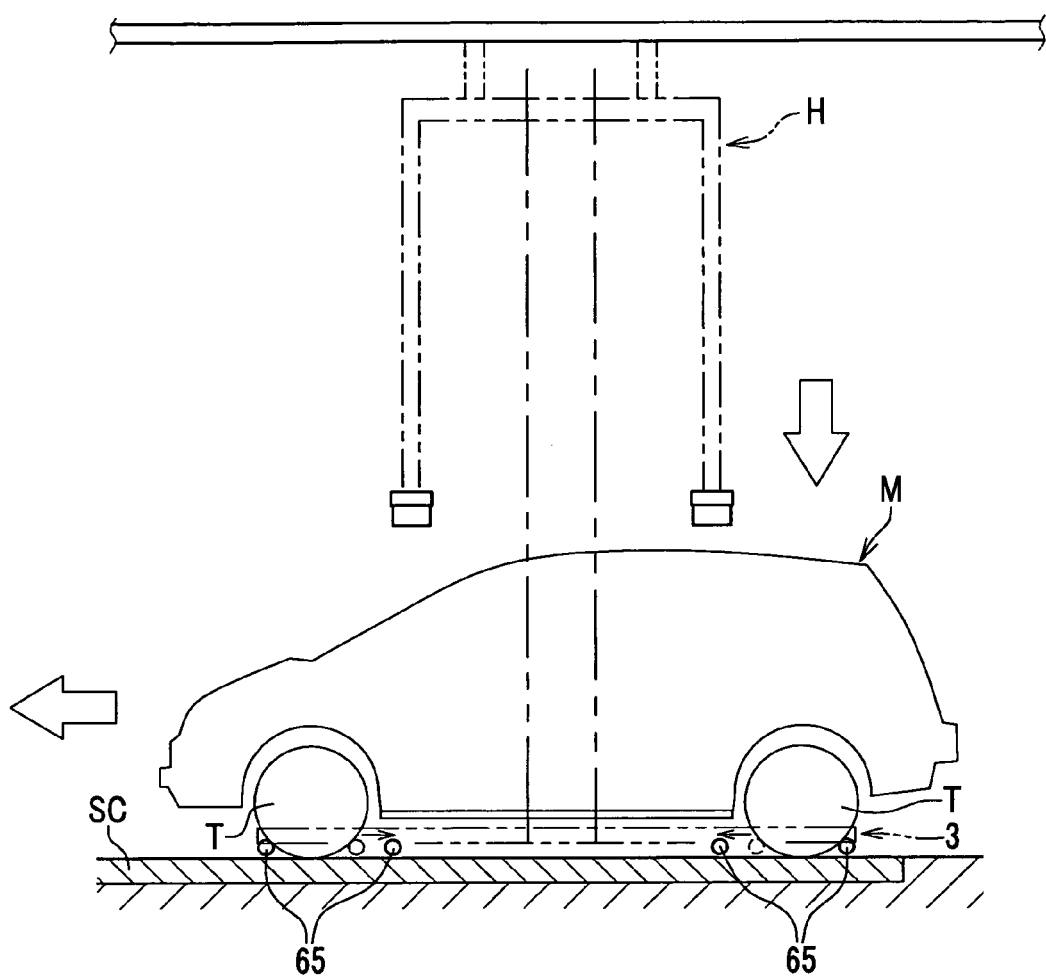
FIG. 7 is a side view showing the state where a vehicle body is placed on the slat conveyor by the lift-unit.

Next, each hanger arm h1 of the conveyance hanger H is swung to a sideward direction by the actuation of the release unit 9, and is disengaged from the vehicle body M. Then, the vehicle body M is moved to a downward direction together with the lift-unit 3 (see FIG. 7).

In this occasion, this downward movement is continued till the lift-unit 3 reaches to the predetermined position, which is the position slightly lower than the position where each tire T of the vehicle body M comes in contact with the slat conveyor SC.

When the lift-unit 3 reaches at the predetermined position, each chucking arm 65 is moved to the tire release position in compliance with the actuation of respective chuck cylinders 62 and 72 (see FIG. 3A and FIG. 3B). Next, each chucking arm 65 is slid to the outward in a left-and-right direction by the actuation of the cylinder 53, and is moved to the position (passing position) where the chucking arm 65 does not interfere with the vehicle body M.

When the vehicle body M is conveyed to the outside of the gantry transfer apparatus 1, as shown in FIG. 8B, each chucking arm 65 is reversed to the initial position (tire support position) by the actuation of the cylinder 53.

Simultaneously, each chucking arm 65 is changed to the closing condition (tire holding position), by which tire T is held, in compliance with the actuation of respective chuck cylinders 62 and 72 (see FIG. 3) to prepare for the next transfer of the vehicle body M (see FIG. 6).

Here, if the wheel base of next vehicle body M to be transferred into the gantry transfer apparatus 1 is differing from the previous vehicle body M, the position of the rear tire supporter 7 is shifted in a fore-and-rear direction by the actuation of the supporter slide mechanism 8. Thereby, the distance between the front tire supporter 6 and the rear tire supporter 7 can be adjusted to the wheel base of the next vehicle body M.

According to the present invention the benefits as follows can be obtained.

(1) In the present invention, the vehicle body M is transferred while supporting tire T of the vehicle body M when the vehicle body M is transferred from the hanger-type conveyance line HL to the support-type conveyance line SL. Thus, the impact to be caused at the time of the transfer of the vehicle is mitigated by tire T. Thereby, the occurrence of the deformation of the flange of the side-sill can be prevented.

(2) In the present invention, tire T is supported by a pair of chucking arms 65 in the condition that part of the bottom side of the tire T is positioning below the chucking arms 65. Thus, the vehicle body M is smoothly transferred to the support-type conveyance line SL when the vehicle body is transferred to a downward direction. This is because the tire T grounds in first with the support-type conveyance line SL and mitigates the impact due to the grounding.

(3) Since each chucking arm 65 is being rotatable, the slide of the chucking arm 65 is not disturbed even if a load of the vehicle body M is acting on respective chucking arms 65. Thereby, each chucking arm 65 can easily be removed from the tire T.

(4) In the present invention, the rear tire supporter 7 is being slidable along a fore-and-rear direction by the supporter slide mechanism 8. Thus, various kinds of vehicles, each is differing in wheel base, can be transferred using the same conveyance line.

In the present invention, additionally, the distance between chucking arms 65 is being adjustable in compliance with the size of the tire T. Thus, various kinds of vehicle bodies, each are differing in the size of tire T, can be transferred using the same conveyance line.

In the present invention, still furthermore, the front tire supporter 6 and the rear tire supporter 7 are allowed to move along a left-and-right direction with respect to the vehicle body by the slider unit 5. Thus, various kinds of vehicle bodies, each is differing in the distance between tires on both sides or differing in size of the width of the vehicle body M, can be transferred using the same conveyance line.

As described above, various types of vehicle bodies, which each are differing in a wheel base, in a distance between tires of both sides, and in a size of tire, can be transferred using the same gantry transfer apparatus 1. Thus, since to provide the specific transfer apparatus to respective lines is not required, the same gantry transfer apparatus can be adopted to any kinds of conveyance line. Thereby, the manufacturing cost can be reduced.

Although there have been disclosed what are the patent embodiment of the invention, it will be understood by person skilled in the art that variations and modifications may be made thereto without departing from the scope of the invention, which is indicated by the appended claims.

In the above described embodiment, the gantry transfer apparatus, which transfers the vehicle body M to a support-type conveyance line SL disposed in a lower-side of a vehicle conveyance line from a hanger-type conveyance line disposed in an upper-side of the vehicle conveyance line, has been explained. But, the present invention is not limited to this. For example, the gantry transfer apparatus may transfer the vehicle body M to a hanger-type conveyance line disposed in an upper-side of the vehicle conveyance line from a support-type conveyance line SL disposed in a lower-side of a vehicle conveyance line.

In the above described embodiment, furthermore, each chucking arm is being rotatable with respect to the support part 63d. But, each chucking arm may be un-rotatable.

Additionally, only a fitting part between the chucking arm and the tire T may be made of rotatable roller.

What is claimed is:

1. A vehicle transfer apparatus, which transfers a vehicle body between a conveyance line disposed in a lower-side of the vehicle conveyance line and a conveyance line disposed in an upper-side of the vehicle conveyance line, the vehicle transfer apparatus comprising:

a stanchion disposed on both sides of the vehicle body;

a lift-body, which is provided to each stanchion in the condition that a slide in an up-and-down direction along the stanchion of the lift-body is allowed;

a tire supporter which supports a tire of the vehicle body in the condition that the lower part of the tire is exposed under the tire supporter;

a lift-unit driver which moves respective lift-bodies in an up-and-down direction; and a slider unit which
  connects the lift-body and the tire supporter,
  mechanically controls a linear motion of the tire supporter to change an interval between the lift-body and the tire supporter, and
  changes the position of the tire supporter between a tire support position and a passing position.

2. A vehicle transfer apparatus according to claim 1, wherein the tire supporter comprising:
  a pair of chucking arms; and
  an arm driver which controls linear motion of chucking arms and changes the position of the pair of chucking arms between a tire holding position and a tire release position.

3. A vehicle transfer apparatus according to claim 2, wherein a part of the chucking arm that has contact with the tire is a rotatable roller.

4. A vehicle transfer apparatus according to claim 1, wherein
  the stanchion is fixed on a floor, and
  the slider unit changes the position of the tire supporter between a tire support position and a passing position without moving the stanchion.

* * * * *